Patented Jan. 23, 1945

2,368,067

UNITED STATES PATENT OFFICE 2,368,067

ORGANIC COMPOUNDS AND THEIR PREPARATION

Kathryn L. Lynch, Stamford, Conn., assignor to American Cyanamid Company, New York, N. Y., a corporation of Maine No Drawing. Application January 14, 1943,
Serial No. 472,385

12 Claims. (Cl. 260—481)

This invention relates to new compounds which have wetting, detergent, dispersing, sudsing and other useful properties. The invention includes the compounds themselves, their methods of preparation, and wetting, emulsifying, demulsifying and detergent compositions containing them.

The compounds of the present invention, the preparation of which will be presently described, may be represented by the general formula

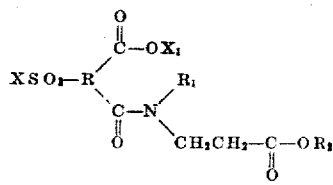

in which X and $X_1$ are members of the group consisting of hydrogen and cationic salt-forming radicals such as metals, ammonia, amines, etc., R is the residue of an aliphatic polycarboxylic acid, $R_1$ is an alkyl radical having from 8 to 20 carbon atoms inclusive, and $R_2$ is $X_1$ or an alkyl radical having from 1 to 5 carbon atoms inclusive.

The preferred method of preparing my new compounds comprises the steps of reacting an anhydride of an unsaturated aliphatic polycarboxylic acid with compounds having the general formula

and sulfonating the resulting product with an alkaline sulfite. The compounds

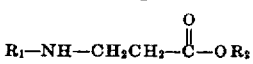

in which $R_1$ and $R_2$ are as designated above, are new and are described and claimed in my copending application Ser. No. 472,386 filed Jan. 14, 1943. These compounds may be broadly designated as N-substituted amino propionates and are prepared by reacting primary alkyl amines having from 8 to 20 carbon atoms with acrylic acid esters of short chain aliphatic alcohols.

The reaction whereby the compounds of the present invention are prepared may be illustrated by means of the following equation in which maleic anhydride is caused to react with methyl N-octadecyl-$\beta$-aminopropionate:

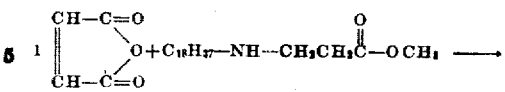

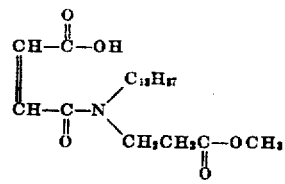

The resulting compound is then sulfonated with sodium sulfite as follows:

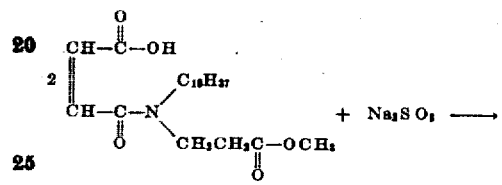

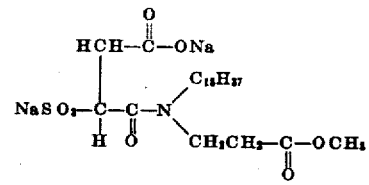

The condensation reaction is slightly exothermic and proceeds to substantial completion in a short period of time, usually not more than one hour being required. Ordinarily I prefer to carry out the reaction at a moderate temperature, i. e., 40 to 70° C., although it is permissible to use temperatures ranging from about 10° C. to 120° C. In general, an excess of the amine is to be avoided since the amount in excess of that required to form a monoamide under the conditions of the reaction tends to form a salt with the unreacted acid group of the acid anhydride. I therefore use a slight excess, generally 2 to 5%, of the acid anhydride based upon the theoretical amount necessary to react with the amine.

Since it is usually more desirable to conduct the reaction in the liquid phase solvents such as carbon tetrachloride, chloroform, acetone, tertiary butanol, benzene, toluene, dioxane, ethers of suitable boiling points, etc. and other inert solvents may be employed. In such cases the reaction mixture is heated under a reflux condenser at least during the early stages of the reaction. The solvent may later be removed by evaporation.

Among the unsaturated polycarboxylic acid anhydrides which may be employed in my preferred method may be mentioned maleic anhydride, methyl maleic (citraconic) anhydride, and other alkyl and aryl substituted maleic anhydrides; itaconic, ethylitaconic and isopropylitaconic anhydrides; glutaric anhydride; muconic anhydride; aconitic anhydride; etc.

The reaction product of polycarboxylic acid anhydrides and N-substituted amino propionates disclosed above sulfonates with extreme rapidity and ease requiring only a matter of minutes at 80° C. for substantially complete sulfonation. As stated before I use an alkaline sulfite although, if desired, the same end may be attained by first neutralizing the free carboxylic acid group of the reaction product of Equation 1 above with an alkaline substance and then sulfonating at the double bond by treatment with an alkaline bisulfite. This latter method is particularly suitable when it is desired that X and $X_1$ be different salt-forming bases.

Although I prefer to prepare my new compounds in the manner outlined above and described in detail in the specific examples they may be prepared by other methods. I may, for example, start with the anhydride of a sulfonated aliphatic polycarboxylic acid such as sulfosuccinic acid, methylsulfosuccinic acid, sulfo-dimethylsuccinic acid, sulfo-isopropylsuccinic acid, sulfophenylsuccinic acid, sulfoglutaric acid, sulfomethylglutaric acid, sulfo-octylglutaric acid, sulfopimelic acid, sulfosubaric acid, sulfosebacic acid, sulfotricarballylic acid, and the like. These anhydrides of sulfopolycarboxylic acids are reacted with substantially equi-molecular parts of N-substituted amino propionates as described hereinbefore to form sulfo acid monoamides which may then be reacted with a salt forming base to yield the compounds of the present invention.

In most of the specific examples which follow I have employed sodium as the salt-forming radical since sodium sulfite and sodium bisulfite are relatively cheap and easily handled. Also, for most purposes my new compounds are of greatest importance in the form of their sodium salts. For special purposes I may prefer to use my compounds in the form of the acid monoamide in which case both X and $X_1$ in the general formula are hydrogen. My new compounds may be prepared, and are also useful, however, in the form of salts in which X and $X_1$ in the general formula are salt-forming radicals such as Na, K, Li, $NH_4$, Ba, Ca, Zn, Cu, Hg, Cd, Mg, Al, etc. or radicals of an amine such as ethanolamine, morpholine, guanidine, pyridine or other hydrophilic salt-forming radicals. In order to introduce these radicals into my new compounds it is not necessary to use them in the form of sulfites or bisulfites since, if desired, I may prepare the free sulfonic acid of the polycarboxylic monoamide and neutralize it with a suitable salt-forming base such as one of the class named. Many of these cationic radicals may also be conveniently introduced by means of double decomposition of the sodium salt and desired metal or cationic radical.

In general, the compounds of the present invention are extremely water-soluble, particularly when X, $X_1$, and $R_2$ are alkali metal radicals. In such cases they are water-soluble up to about 50% by weight. Compounds of this type are for the most part difficultly soluble in alcohols, ethers, kerosene and other organic solvents. When $R_2$ in the general formula is an alkyl group the compounds are less water-soluble, about 15 to 25% by weight in water, but are more soluble in organic solvents of the type named. Most of them are colorless pulverable solids. Their aqueous solutions have a pH of about 6.5 to 8.0 depending, of course, upon the nature of the substituted groups. Their solutions possess a high calcium tolerance and show wetting, emulsifying, demulsifying, dispersing, foaming, detergent and other surface active characteristics. They are soluble and stable in strong acid solutions and may be employed in many arts for most purposes for which surface active compounds have been heretofore employed.

The invention will now be described in greater detail by means of the following specific examples. It should be understood that while these examples describe in detail some specific manipulative steps which may be employed in the preparation of the compounds they are given primarily by way of illustration and the invention in its broader aspects is not to be limited thereto.

EXAMPLE 1

*N-octadecyl,N-(2-carboethoxyethyl) disodium sulfosuccinamate*

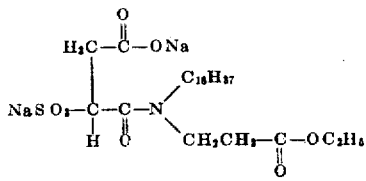

92 g. (0.25 mol) of ethyl N-octadecyl-β-aminopropionate is dissolved in 75 cc. of tertiary butanol and 25 g. (0.25 mol+2% excess) of maleic anhydride is added slowly with stirring while keeping the temperature of the reaction mixture between 60 and 70° C. The reaction is slightly exothermic. The temperature of the reaction mixture is held at 65° C. for one-half hour and the solution is then poured into a hot solution of 32.5 g. (0.4 mol+4% excess) of sodium sulfite in 200 cc. of water. The maleiamic acid dissolves at once in the sodium sulfite solution to give clear solutions at 80° C. The reaction mixture is held at this temperature for about one hour to insure completion of the reaction. The solvent is then evaporated and the product dried at 105° C. A yield of 145 g. (98% of theory) of N-octadecyl,N-(2-carboethoxyethyl) disodium sulfosuccinamate is obtained. The product is a white waxy solid, soluble in water to give clear solutions having a pH of 6.5. The product is also soluble in kerosene, mineral and vegetable oils.

Chemical analysis of the product shows that it compares well with the theoretical values for N-octadecyl,N-(2-carboethoxyethyl) disodium sulfosuccinamate. A sample of the product prepared as described above gave the following results upon analysis:

|  | Nitrogen | Saponification No. | Sulfated ash |
|---|---|---|---|
|  | Percent | | Percent |
| Theoretical | 2.36 | 94.5 | 23.9 |
| Found | 2.43 | 93.4 | 23.5 |

Aqueous solutions of N-octadecyl,N-(2-carboethoxyethyl) disodium sulfosuccinamate have very good wetting properties as shown by the results obtained upon testing samples of the product by the Draves sinking test at 30° C. The results of this series of tests were as follows:

Draves sinking test at 30° C.

Conc. in grams
  per liter____ 10    5    2.5    1.0    0.75   0.5
Sinking time
  in seconds__ 32.5 33.5  46.7  60.9  69.8    95

The product is also a very good foaming agent and detergent and has a high resistance to precipitation by calcium and magnesium ions.

EXAMPLE 2

N-octadecyl,N-(2-carbomethoxyethyl) disodium sulfosuccinamate

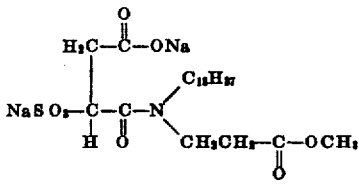

96 g. (0.25 mol) of methyl N-octadecyl-β-aminopropionate dissolved in 100 cc. of tertiary butanol is added slowly to 25 g. (0.25 mol+2% excess) of maleic anhydride and the mixture heated at 75° C. for 15 minutes to complete the reaction. The reaction mixture is then poured into a hot solution of 32.5 g. (0.25 mol+5% excess) of sodium sulfite in 250 cc. of water. Sulfonation of the maleiamic acid derivative is completed by keeping the solution at 80 to 85° C. for one hour. The solvents are then distilled off and the product dried at 90 to 95° C. N-octadecyl,N-(2-carbomethoxyethyl) disodium sulfosuccinamate is obtained in theoretical yields as a cream-colored solid. It is soluble in water to give clear, strongly foaming solutions having a pH of 6.5. It is an excellent detergent, foaming, emulsifying and dispersing agent.

Chemical analysis of a product obtained by the process of the preceding paragraph checked closely with the theoretical values for N-octadecyl,N-(2-carbomethoxyethyl) disodium sulfosuccinamate.

|  | Nitrogen | Sulfur | Sulfated ash |
|---|---|---|---|
|  | Per cent | Per cent | Per cent |
| Theoretical | 2.42 | 5.53 | 24.5 |
| Found | 2.43 | 5.63 | 25.0 |

The wetting power of the compound is demonstrated by the Draves sinking test at 30° C. with the following results:

Draves sinking test at 30° C.

Conc. in grams per
  liter _____ 10   5.0   2.5   1.25   0.315
Sinking time in
  seconds _____ 28.5 34.0 39.5  53.3   132

EXAMPLE 3

The N-dodecyl, N-tetradecyl, N-hexadecyl and N-octadecenyl,N-(2-carboalkoxyethyl) disodium sulfosuccinamates are prepared in exactly the same way as described in the preceding examples with the exception that the corresponding N-alkyl-β-amino-propionate ester is employed in molecular equivalent quantities. The dodecyl and tetradecyl derivatives are better wetting agents than the octadecyl N-carboalkoxyethyl disodium sulfosuccinamates but not quite so efficient as detergents. Potassium or ammonium salts are prepared by substituting potassium or ammonium sulfite for sodium sulfite. The properties of the resulting compounds are altered but little as a result of the substitution.

EXAMPLE 4

N-octadecyl,N-(2-carboxyethyl) trisodium sulfosuccinamate

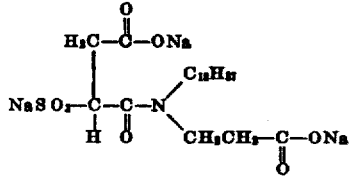

91 g. (0.25 mol) of sodium N-octadecyl-β-amino-propionate is dissolved in 100 cc. teritiary butanol and 25 g. (0.25 mol+2% excess) of maleic anhydride is added and the mixture heated on a steam bath at 80° C. for 15 minutes after which is added 32.5 g. of sodium sulfite dissolved in 250 cc. of hot water. The solution is held at 85 to 90° C. for 15 hours to insure complete sulfonation and then dried by evaporating off the solvents. A yield of 150 g. of a white pulverable solid, very readily soluble in water to give clear, strongly foaming solutions of pH of 7.0 to 7.5; is obtained. The product, N-octadecyl,N-(2-carboxyethyl) trisodium sulfosuccinamate is an excellent detergent and dispersing agent.

Chemical analysis of a sample of the product compared favorably with the theoretical analysis for N-octadecyl,N-(2-carboxyethyl) trisodium sulfosuccinamate as shown by the following results:

|  | Nitrogen | Sulfur | Sulfated ash |
|---|---|---|---|
|  | Per cent | Per cent | Per cent |
| Theoretical | 2.38 | 5.45 | 36.3 |
| Found | 2.30 | 5.40 | 35.6 |

The wetting properties of the compound are shown by the Draves sinking test as follows:

Draves sinking test at 30° C.

Conc. in grams per
  liter _____ 10    5    2.5   1.25   0.625
Sinking time in
  seconds _____ 43.6 47.9 47.2  66.6   125

EXAMPLE 5

N-octadecyl,N-(2-carboxyethyl) trisodium sulfosuccinamate, described in the preceding example may also be prepared by heating one mol of N-octadecyl,N-(2-carboethoxyethyl) disodium sulfosuccinamate prepared as described in Example 1 with one mol of sodium hydroxide at 25 to 90° C. in aqueous solution. In this process the ester is saponified and the ethyl group replaced with sodium. Evaporation of solvents gives a product identical with that obtained in the preceding example.

N-dodecyl,N-(2-carboxyethyl) trisodium sulfosuccinamate, N-tetradecyl,N-(2-carboxyethyl) trisodium sulfosuccinamate, N-hexadecyl,N-(2-carboxyethyl) trisodium sulfosuccinamate and N-octadecenyl,N-(2-carboxyethyl) trisodium sulfosuccinamate are prepared in the same manner and have substantially the same properties as the octadecyl derivative.

Potassium, ammonium, triethanolamine, lithium, etc. salts of these compounds may be prepared by utilizing the desired sulfite and alkali as in the above method.

I claim:

1. Organic compounds having the general formula

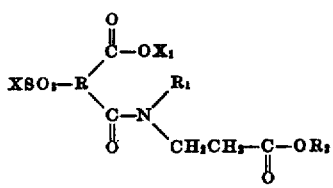

in which X and $X_1$ are members of the group consisting of hydrogen and cationic salt-forming radicals, R is the residue of an aliphatic polycarboxylic acid, $R_1$ is an alkyl radical having from 8 to 20 carbon atoms inclusive, and $R_2$ is a member of the group consisting of hydrogen, cationic salt-forming radicals and alkyl radicals having 1 to 5 carbon atoms inclusive.

2. Organic compounds having the general formula

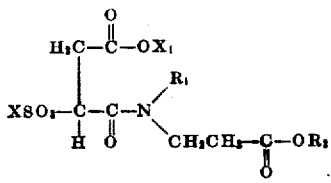

in which X and $X_1$ are members of the group consisting of hydrogen and cationic salt-forming radicals, $R_1$ is an alkyl radical having from 8 to 20 carbon atoms inclusive, and $R_2$ is a member of the group consisting of hydrogen, cationic salt-forming radicals and alkyl radicals having 1 to 5 carbon atoms inclusive.

3. Organic compounds having the general formula

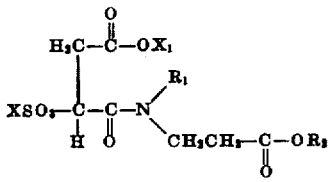

in which X and $X_1$ are alkali metals, $R_1$ is an alkyl radical having from 8 to 20 carbon atoms inclusive, and $R_2$ is an alkyl radical having from 1 to 5 carbon atoms inclusive.

4. N-octadecyl,N-(2-carboethoxyethyl) disodium sulfosuccinamate.

5. N-octadecyl,N-(2-carbomethoxyethyl) disodium sulfosuccinamate.

6. N-octadecyl,N-(2-carboxyethyl) trisodium sulfosuccinamate.

7. A process of preparing compounds having the general formula

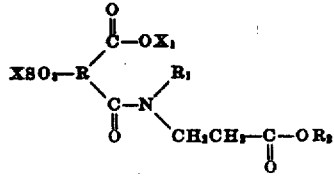

in which X and $X_1$ are members of the group consisting of hydrogen and cationic salt-forming radicals, R is the residue of an aliphatic polycarboxylic acid, $R_1$ is an alkyl radical having from 8 to 20 carbon atoms inclusive, and $R_2$ is a member of the group consisting of hydrogen, cationic salt-forming radicals and alkyl radicals having 1 to 5 carbon atoms inclusive, which comprises reacting an anhydride of an unsaturated aliphatic polycarboxylic acid with a compound having the general formula

in which $R_1$ and $R_2$ are as designated above and sulfonating the resulting product with an alkaline sulfite.

8. A method of preparing compounds of the general formula

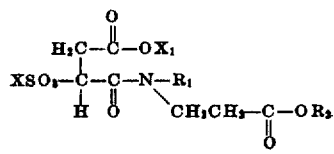

in which X and $X_1$ are members of the group consisting of hydrogen and cationic salt-forming radicals, and $R_1$ is an alkyl radical having from 8 to 20 carbon atoms inclusive, and $R_2$ is a member of the group consisting of hydrogen, cationic salt-forming radicals and alkyl radicals having 1 to 5 carbon atoms inclusive, which comprises reacting maleic anhydride with compounds having the general formula

in which $R_1$ and $R_2$ are as designated above and sulfonating the resulting product with an alkaline sulfite.

9. A method of preparing organic compounds having the general formula

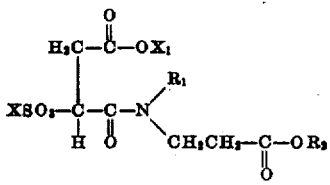

in which X and $X_1$ are alkali metals, $R_1$ is an alkyl radical having from 2 to 12 carbon atoms inclusive, and $R_2$ is an alkyl radical having from 1 to 5 carbon atoms inclusive, which comprises reacting maleic anhydride with compounds having the general formula

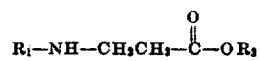

in which $R_1$ and $R_2$ are as designated above and sulfonating the resulting product with an alkali sulfite.

10. A method of preparing organic compounds having the general formula

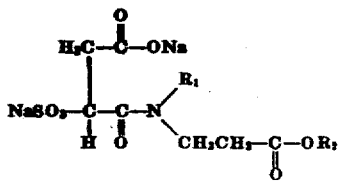

in which $R_1$ is an alkyl radical having from 8 to 20 carbon atoms inclusive, and $R_2$ is an alkyl radical having from 1 to 5 carbon atoms inclusive, which comprises reacting maleic anhydride with compounds having the general formula

in which $R_1$ and $R_2$ are as designated above and sulfonating the resulting product with sodium sulfite.

11. A method of preparing N-octadecyl,N-(2-carboethoxyethyl) disodium sulfosuccinamate which comprises reacting maleic anhydride with ethyl N-octadecyl-β-aminopropionate and sulfonating the resulting product with sodium sulfite.

12. A method of preparing N-octadecyl,N-(2-carbomethoxyethyl) disodium sulfosuccinamate which comprises reacting maleic anhydride with methyl N-octadecyl-β-aminopropionate and sulfonating the resulting product with sodium sulfite.

KATHRYN L. LYNCH.

CERTIFICATE OF CORRECTION.

Patent No. 2,368,067. January 23, 1945.

KATHRYN L. LYNCH.

It is hereby certified that error appears in the printed specification of the above numbered patent requiring correction as follows: Page 3, second column, line 37, for "15 hours" read --1.5 hours--; page 4, second column, line 64, claim 9, for "2 to 12 carbon atoms" read --8 to 20 carbon atoms--; and that the said Letters Patent should be read with this correction therein that the same may conform to the record of the case in the Patent Office.

Signed and sealed this 24th day of April, A. D. 1945.

Leslie Frazer (Seal) Acting Commissioner of Patents.

10. A method of preparing organic compounds having the general formula

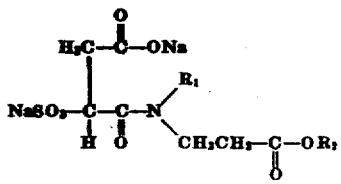

in which $R_1$ is an alkyl radical having from 8 to 20 carbon atoms inclusive, and $R_2$ is an alkyl radical having from 1 to 5 carbon atoms inclusive, which comprises reacting maleic anhydride with compounds having the general formula

in which $R_1$ and $R_2$ are as designated above and sulfonating the resulting product with sodium sulfite.

11. A method of preparing N-octadecyl,N-(2-carboethoxyethyl) disodium sulfosuccinamate which comprises reacting maleic anhydride with ethyl N-octadecyl-β-aminopropionate and sulfonating the resulting product with sodium sulfite.

12. A method of preparing N-octadecyl,N-(2-carbomethoxyethyl) disodium sulfosuccinamate which comprises reacting maleic anhydride with methyl N-octadecyl-β-aminopropionate and sulfonating the resulting product with sodium sulfite.

KATHRYN L. LYNCH.

CERTIFICATE OF CORRECTION.

Patent No. 2,368,067.   January 23, 1945.

KATHRYN L. LYNCH.

It is hereby certified that error appears in the printed specification of the above numbered patent requiring correction as follows: Page 3, second column, line 37, for "15 hours" read --1.5 hours--; page 4, second column, line 64, claim 9, for "2 to 12 carbon atoms" read --8 to 20 carbon atoms--; and that the said Letters Patent should be read with this correction therein that the same may conform to the record of the case in the Patent Office.

Signed and sealed this 24th day of April, A. D. 1945.

Leslie Frazer (Seal)   Acting Commissioner of Patents.